UNITED STATES PATENT OFFICE 2,571,687

COPOLYMERS OF β,β-DIFLUOROACRYLIC ACID ESTERS

Joseph B. Dickey, Rochester, N. Y., and James G. McNally, Kingsport, Tenn., assignors to Eastman Kodak Company, Rochester, N. Y., a corporation of New Jersey No Drawing. Application August 15, 1949,
Serial No. 110,475

11 Claims. (Cl. 260—86.1)

This invention relates to resins resulting from the copolymerization of β,β-difluoroacrylic acid esters with other unsaturated compounds and their method of preparation.

This invention has for its object the preparation of new copolymers. Another object of this invention is to prepare copolymers of β,β-difluoroacrylic acid esters. A further object of this invention is the preparation of copolymers useful in molding compositions, coating compositions, and the like. Other objects of this invention will appear herein.

These objects are accomplished by the copolymerization of β,β-difluoroacrylic acid esters with unsaturated compounds containing a C=C group therein. The β,β-difluoroacrylic acid esters which are suitable for use as the starting material for preparing copolymers in accordance with our invention have the following structural formula:

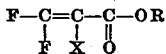

in which X represents hydrogen, methyl, ethyl, propyl or butyl and R represents an alkyl group of not more than four carbon atoms an aralkyl group such as benzyl or an aryl group such as phenyl, cresyl, naphthyl, or the like. Some of the compounds of this type which are useful as the starting material for the preparation of esters in accordance with our invention are as follows:

Ethyl-3,3-difluoroacrylate
Methyl-3,3-difluoroacrylate
Methyl-3,3-difluoromethacrylate
Ethyl-3,3-difluoromethacrylate
Isopropyl-3,3-difluoroacrylate
Methyl-3,3-difluoroethacrylate
Benzyl-3,3-difluoromethacrylate
Cresyl-3,3-difluoromethacrylate These compounds may be prepared by a process as illustrated by the following example of making ethyl-3,3-difluoroacrylate.

*Example 1.*—Oxygen containing 10% of chlorine was bubbled through 350 g. of

(U. S. Patent No. 2,456,768) at 30–50° C. in the presence of ultraviolet light for 70–90 hours. The reaction product which consists principally of a mixture of

and

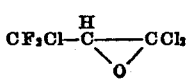

was reacted with one liter of ethyl alcohol by adding it slowly to the alcohol at room temperature. After addition was complete the mixture was allowed to stand at room temperature for several hours and then poured into water to recover ethyl-2,3-dichloro-3,3-difluoropropionate. 175 parts of this material were refluxed with 100 parts of zinc dust in 500 parts of absolute ethyl alcohol for eight hours, a small proportion of hydroquinone having been added to act as a polymerization inhibitor. After filtering, the filtrate was diluted with water and the resulting product, ethyl-3,3-difluoroacrylate was purified by vacuum distillation.

The unsaturated compounds which are copolymerizable with the difluoroacrylic esters are those having an aliphatic C=C group therein. Compounds which have been to be most suitable for copolymerizing with the difluoroacrylates are those having the structure of ethylene with substituents such as hydrogen, fluorine, chlorine, or lower alkyl thereon. Also, the vinyl esters and acrylic or methacrylic acid esters have been found to be useful as unsaturated compounds to copolymerize with the difluoroacrylates. Some of the compounds which have been found to be suitable for copolymerizing with the difluoroacrylates are as follows:

1. Vinyl compounds — vinyl acetate, vinyl butyrate, vinyl chloride, vinyl fluoride, N-ethyl vinyl sulfonamide, vinyl isopropyl sulfone, methyl vinyl ketone, N-vinyl urea, and N-vinyl ethyl carbamate, 2. Isopropenyl compounds—isopropenyl acetate, and methyl isopropenyl ketone, 3. Unsaturated acid radical compounds—methyl acrylate, methyl methacrylate, methyl crotonate, acrylic acid amide, methyl maleate, diisopropyl fumarate, acrylonitrile and methacrylonitrile, 4. Aromatic compounds with unsaturated groups attached thereto—styrene and α-methylstyrene, 5. Vinylidene compounds—vinylidene dichloride, vinylidene difluoride, and vinylidene chloride fluoride, 6. Unsaturated hydrocarbon compounds—ethylene and isobutylene.

The polymerizations in accordance with our invention are preferably carried out in the presence of some agent which promotes polymerization. This may be a physical promoter, such as light or heat, or a chemical promoter, such as oxygen or an oxygen catalyst, for instance, benzoyl peroxide, hydrogen peroxide, acetyl peroxide, and the like or an aliphatic azo compound such as

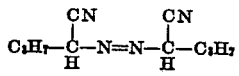

The desired copolymerizations may be carried out either with the materials in emulsion form or with or without a diluent, such as benzol, chloroform, trichloroethylene, or the like.

The following examples illustrate our invention:

*Example 2.*—13.5 parts of methyl $\beta,\beta$-difluoroacrylate, 8.6 parts of vinyl acetate, 100 parts of water, 1 part of the sulfate of secondary lauryl alcohol as the wetting agent, 0.25 part of ammonium persulfate and 0.25 part of sodium bisulfite were sealed in a glass container and tumbled in a water bath at 50° C. until polymerization was complete. The container was then cooled and opened and its contents were poured out, warmed, and coagulated with salt. The resulting coagulated material was filtered and washed with water. A white solid polymer was obtained which was useful for molding purposes.

*Example 3.*—15 parts of methyl $\beta,\beta$-difluoromethacrylate, 10 parts of styrene, 100 parts of water, 1 part of a wetting agent (the sodium salt of the sulfate of secondary lauryl alcohol), 0.25 part of ammonium persulfate and 0.25 part of sodium bisulfite were mixed together and sealed in a glass container. The container was tumbled in a water bath at 50° C. until polymerization was complete. The container was then cooled and opened and the aqueous emulsion was removed and coagulated, filtered, washed and dried. A colorless polymer was obtained which was useful for molding purposes.

*Example 4.*—13.5 parts of methyl $\beta,\beta$-difluoroacrylate, 8 parts of vinylidene chloride-fluoride, 100 parts of water, 1 part of wetting agent, 0.25 part of ammonium persulfate and 0.25 part of sodium bisulfite were mixed at 0° C. in a silver-lined autoclave and was heated for twenty hours at 50–75° C. The polymer obtained was coagulated, filtered, washed and dried as described in the preceding examples. A white, moldable solid was obtained. The procedure was repeated except that vinylidene difluoride and vinylidene dichloride were each employed instead of vinylidene chloride-fluoride. Similar results were obtained.

*Example 5.*—A stainless steel autoclave was charged with a solution containing 0.1 part of potassium persulfate and one part of borax in 50 parts of water. The autoclave was evacuated and charged with 5 parts of tetrafluoroethylene and 10 parts of methyl $\beta,\beta$-difluoroacrylate. The material was agitated and heated for one hour at 80° C. The polymer was obtained which could be molded or pressed into films.

*Example 6.*—10 parts of 1,1-difluoro-2,2-dichloroethylene and 10 parts of methyl $\beta,\beta$-difluoroacrylate were mixed with 100 parts of distilled water containing two parts of the sodium salt of a sulfonated alcohol as the wetting agent and 0.4 part of potassium persulfate. The mixture was placed in a pressure bottle and the mass was agitated and heated at 50° C. for sixteen hours. The polymer obtained was precipitated by adding a small amount of a saturated salt solution and was filtered, washed, and dried as described above. The polymer obtained was useful for molding or pressing into films.

*Example 7.*—A stainless steel autoclave was swept with nitrogen and charged with 25 parts of de-oxygenated water containing 0.2 part of benzoyl peroxide therein. The autoclave was then charged with 25 parts of chlorotrifluoroethylene and 10 parts of methyl $\beta,\beta$-difluoroacrylate. The mass was agitated and heated at 80° C. for sixteen hours. The autoclave was then cooled, the pressure was released, and the polymerization product was obtained as a white powder. The polymer thus obtained was found to be useful for molding purposes.

*Example 8.*—13.6 parts of methyl $\beta,\beta$-difluoroacrylate, 10 parts of isopropylfumarate, 5 parts of methylacrylate and 0.03 part of benzoyl peroxide were placed in a glass sealed tube and heated at 60° C. until polymerization was complete. A clear solid was obtained that molds with ease by means of heat and pressure.

*Example 9.*—13.6 parts of methyl $\beta,\beta$-difluoromethacrylate and 5.6 parts of isobutylene was placed in a glass tube and cooled to −60° C. Boron trifluoride gas was then slowly added at the bottom of the tube with a trace of moisture. When polymerization was complete, water was added and the mass was decanted, the product was dissolved in benzene, precipitated by pouring into alcohol, separated and dried. A clear, water-white material was obtained.

*Example 10.*—13.6 parts of methyl $\beta,\beta$-difluoromethacrylate was mixed with 10.2 parts of isopropenyl alcohol and 10 parts of methylmethacrylate and the mixture was heated with 0.03 part of benzoyl peroxide in a sealed tube at 60–80° C. until the polymerization was complete. The product which was water white could be readily molded.

*Example 11.*—A mixture was prepared of 13.6 parts of methyl $\beta,\beta$-difluoromethacrylate and 10 parts of isopropylfumarate together with 0.03 part of benzoyl peroxide. This mixture was heated in a sealed glass tube at 50–60° C. until the mixture had solidified. The clear solid was removed from the tube and molded as desired.

*Example 12.*—13.6 parts of methyl $\beta,\beta$-difluoromethacrylate, 6 parts of vinyl chloride and 0.01 part of benzoyl peroxide were mixed, placed in a sealed glass tube and heated as described in the preceding example. The product obtained was a clear solid which could be readily molded by means of pressure and heat.

*Example 13.*—13.6 parts of methyl $\beta,\beta$-difluoroacrylate, 100 cc. of distilled water, 1 g. of lauryl sulfate sodium salt are placed in a silver lined autoclave with 0.1 g. of sodium persulfate, capped and ethylene is pumped in until a pressure of 500 atmospheres is reached. The autoclave is slowly heated to 80–100° and maintained at that temperature for several hours. The resulting polymer is a clear tough solid.

What we claim as our invention and desire to be secured by Letters Patents of the United States is:

1. The polymer resulting from the polymerization of a composition essentially consisting of 28–70% of an ester having the formula

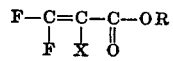

X being a substituent selected from the group of hydrogen, methyl, ethyl, propyl and butyl, and R being a substituent selected from the group of alkyls of not more than four carbon atoms, benzyl, phenyl, cresyl and naphthyl, and an unsaturated compound containing but one aliphatic C=C group per molecule.

2. The polymer resulting from the polymerization of a composition essentially consisting of 28–70% of a methyl ester of a β,β-difluoroacrylic acid and an unsaturated compound containing but one aliphatic C=C group per molecule.

3. The polymer resulting from the polymerization of a composition essentially consisting of 28–70% of a lower alkyl ester of a β,β-difluoroacrylic acid and vinyl acetate.

4. The polymer resulting from the polymerization of a composition essentially consisting of 28–70% of a lower alkyl ester of a β,β-difluoroacrylic acid and styrene.

5. The polymer resulting from the polymerization of a composition essentially consisting of 28–70% of a lower alkyl ester of a β,β-difluoroacrylic acid and tetrafluoroethylene.

6. The polymer resulting from the polymerization of a composition essentially consisting of 28–70% of a lower alkyl ester of a β,β-difluoroacrylic acid and difluor, dichlorethylene.

7. The polymer resulting from the polymerization of a composition essentially consisting of 28–70% of methyl β,β-difluoroacrylate and vinyl acetate.

8. The polymer resulting from the polymerization of a composition essentially consisting of 28–70% of methyl β,β-difluoroacrylate and styrene.

9. The process of preparing a copolymer which comprises heating together under polymerizing conditions a composition essentially consisting of 28–70% of an ester having the formula

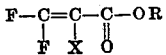

X being a substituent selected from the group of hydrogen, methyl, ethyl, propyl, and butyl, and R being a substituent selected from the group of the alkyls of not more than four carbon atoms, phenyl, benzyl, cresyl and naphthyl and an unsaturated compound containing but one aliphatic C=C group per molecule.

10. The process of preparing a copolymer which comprises heating together under polymerizing conditions 28–70% of a lower alkyl ester of a β,β-difluoroacrylic acid and an unsaturated compound containing but one alphatic C=C group per molecule.

11. The process of preparing a copolymer which comprises heating together under polymerizing conditions while in emulsion form a composition essentially consisting of 28–70% of a lower alkyl ester of a β,β-difluoroacrylic acid and an unsaturated compound containing but one aliphatic C=C group per molecule.

JOSEPH B. DICKEY.
JAMES G. McNALLY.

REFERENCES CITED

The following references are of record in the file of this patent:

UNITED STATES PATENTS

| Number | Name | Date |
|---|---|---|
| 2,337,681 | Pollack | Dec. 28, 1943 |
| 2,403,267 | Davis | July 2, 1946 |
| 2,454,663 | McGinty | Nov. 23, 1948 |
| 2,472,811 | Dickey | June 14, 1949 |